United States Patent
Viola et al.

(10) Patent No.: US 8,367,778 B2
(45) Date of Patent: Feb. 5, 2013

(54) PROCESS FOR THE ELIMINATION OF RESIDUAL MERCAPTANS FROM NITRILE RUBBERS

(75) Inventors: Gian Tommaso Viola, Cervia (IT); Davide De Santi, Ravenna (IT); Romano Lima, Godo (IT)

(73) Assignee: Polimeri Europa S.p.A., San Donato Milanese (IT)

( * ) Notice: Subject to any disclaimer, the term of this patent is extended or adjusted under 35 U.S.C. 154(b) by 666 days.

(21) Appl. No.: 12/540,791

(22) Filed: Aug. 13, 2009

(65) Prior Publication Data

US 2010/0063216 A1    Mar. 11, 2010

(30) Foreign Application Priority Data

Sep. 9, 2008  (IT) .............................. MI2008A1603

(51) Int. Cl.
  C08F 20/44 (2006.01)
  C08F 2/26 (2006.01)
  C08F 8/34 (2006.01)
  C08F 36/00 (2006.01)
(52) U.S. Cl. ..................... 525/329.1; 525/350; 526/224; 526/335

(58) Field of Classification Search .................. 526/335, 526/224; 525/329.1, 350
See application file for complete search history.

(56) References Cited

U.S. PATENT DOCUMENTS 6,870,019 B2 * 3/2005 Kajiwara et al. .............. 526/225

FOREIGN PATENT DOCUMENTS

| DE | 3406231 A1 | 8/1985 |
| EP | 1 215 236 A2 | 6/2002 |
| GB | 1 480 112 | 7/1977 |

* cited by examiner

*Primary Examiner* — Ling Choi
*Assistant Examiner* — Chun-Cheng Wang
(74) *Attorney, Agent, or Firm* — Oblon, Spivak, McClelland, Maier & Neustadt, L.L.P.

(57) ABSTRACT

Process for the elimination of residual mercaptans from nitrile rubbers, comprising:
a. adding a colloidal emulsion of sulfur to a nitrile latex emulsion (NBR rubber latex) containing free mercaptan and with a pH of between 7 and 14, at a temperature ranging from 30 to 120° C.;
b. coagulating the nitrile latex
c. washing with demineralized water and drying the NBR rubber recovered after coagulation.

16 Claims, 1 Drawing Sheet

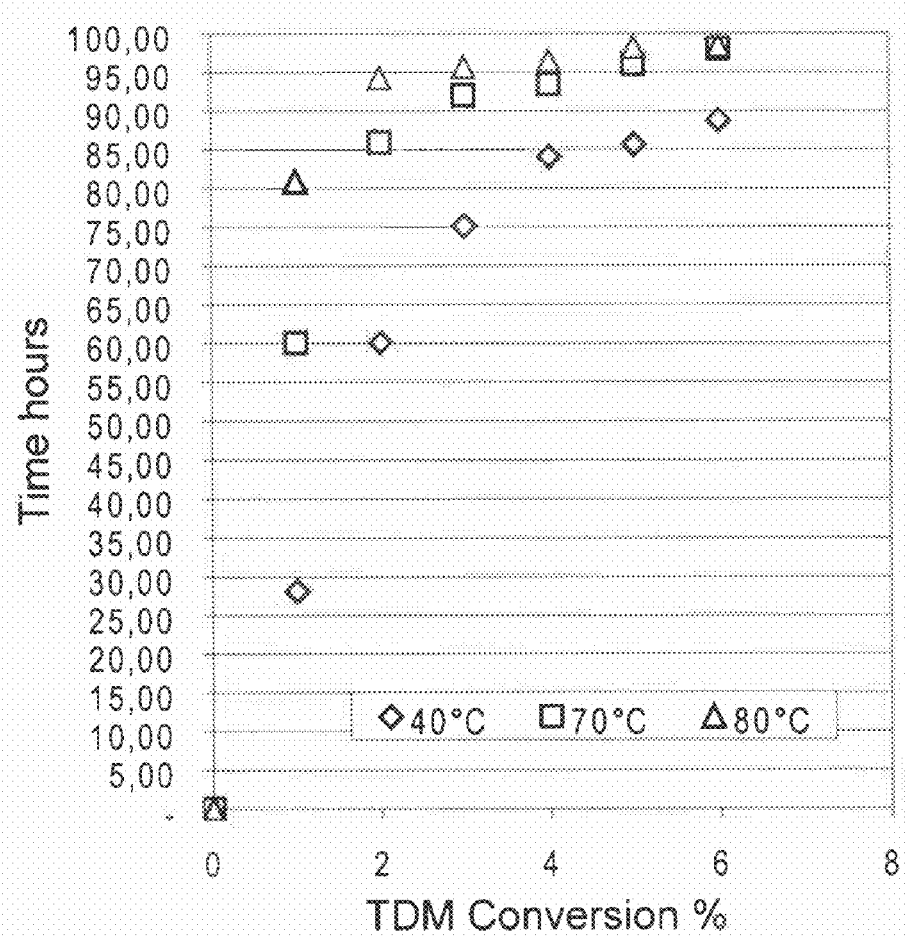

PROCESS FOR THE ELIMINATION OF RESIDUAL MERCAPTANS FROM NITRILE RUBBERS

The present invention relates to a method for the elimination of residual mercaptans from nitrile rubbers More specifically, the present invention relates to a method for eliminating residual mercaptans in butadiene-acrylonitrile copolymers with a content of nitrile monomer ranging from 19 to 45% by weight. Said copolymers are indicated hereunder with the synonyms "nitrile rubbers or NBR" which are known to experts in the field.

All the conditions indicated in the text should be considered as being preferred even if not explicitly specified.

It is known that the copolymerization of butadiene and acrylonitrile (ACN) for the production of nitrile rubbers takes place by means of a polymerization process in emulsion initiated by means of radicals generated by a redox couple at temperatures not higher than 10° C. ("cold" process). This process represents the historical evolution of a process in emulsion in which the generation of radicals took place by means of thermal homolysis (temperatures higher than 60° C.) of peroxide species ("hot" process). Both the "cold" process and "hot" process require the use of substances capable of transferring the kinetic chain of the radicals in propagation avoiding, or better, limiting the formation of extremely interconnected fractions (gels) which limit or in any case complicate the mixing phases during the preparation of the blends. These substances are characterized by having a hydrogen atom which is particularly available for reacting with the propagating radical. Different types of these substances have been studied, but thiols (mercaptans), products in which the —SH group bound to a carbon is present, which can be of the primary, secondary or tertiary type, have proved to be particularly effective in the transfer reaction. The acidity, and therefore the availability of the proton for transfer, thus derives from the structure of the thiol, in the order tertiary>secondary>primary wherein > indicates the greater acidity of the thiol. As a non-limiting example, the following thiols are normally used:

n-octyl mercaptan;
n-dodecyl mercaptan;
tert-dodecyl mercaptan (TDM);

particularly used in industrial practice is the tertiary thiol obtained from the trimer of isobutene (TDM 3B) or the tetramer of propene (TDM 4P) respectively having the structure formula illustrated in the following scheme:

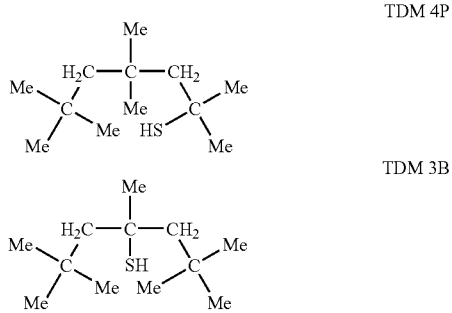

Against a high efficiency in avoiding or at least reducing the gel content in rubber, mercaptans have the characteristic of an unpleasant and pungent odour. As they are not completely used up during the reaction, significant residual quantities of thiols, and in any case ranging from 100 to 3,000 ppm (these quantities refer to the rubber contained in the latex, generally in a quantity of 15 to 40% by weight), cause unpleasant odours which can create problems of an environmental nature, above all in the processing phase. These problems are particularly serious when, as in a typical charge in a mixer, quantities of rubber higher than 100 kg are treated at temperatures not lower than 100° C. Under these conditions the vapour pressure of said mercaptans is such as to make the presence of operators not adequately protected, difficult. It is therefore important to find a method for the removal of residual mercaptans from rubber.

Three main methods have so far been adopted for removing mercaptans from polymers. The first in which the removal/reduction took place in the stripping phase, from the polymer latex, of the residual mercaptan together with the non-reacted monomers, with the use of vapour. The second by treating the latex at temperatures not lower than 70° C. with oxidizing chemical agents and the third which exploits the sum reaction of the mercaptan in a base solution on the free acrylonitrile (Michael reaction).

According to the first method, it is possible to reduce/eliminate the content of mercaptan by treatment of the NBR latex by means of vapour. The process is consequently not economical as the elimination of the thiol is difficult due to its low vapour pressure and its preferential distribution in the rubber particles. The result is consequently a distillation process in a vapour stream which becomes increasingly less efficient with a decrease in the quantity of residual thiol. It is also known, moreover, that prolonged vapour treatment also has negative effects on the final properties of the rubber.

The use of oxidants, described for example in U.S. Pat. No. 3,756,976, such as peroxides, or organic hypochlorites causes the formation of radicals which have a deleterious effect on the final characteristics of the rubber both in terms of processability and resistance to aging.

U.S. Pat. No. 3,980,600 discloses that the reduction/elimination of the content of residual mercaptans can be effected by exploiting the sum reaction of the mercaptan on the ACN residue in a base solution. This reaction causes the formation of a stable adduct at room temperature, but which re-generates the constituents and therefore ACN and mercaptan at the processing or moulding temperature.

SUMMARY OF THE INVENTION

It has now been surprisingly found, as is better described in the enclosed claims, that colloidal sulfur added to an emulsion of nitrile latex (NBR latex) containing free mercaptan in quantities ranging from 100 to 3,000 ppm (these quantities refer to the rubber contained in the latex, generally in a quantity of 15 to 40% by weight, the remaining percentage substantially consisting of water) and having a pH ranging from 7 to 14, at a temperature ranging from 30° C. to 120° C., preferably from 40° C. to 80° C., reacts quantitatively with the mercaptan in times not less than 180', said time being inversely proportional to the temperature at which the reaction is carried out.

DRAWINGS

FIG. 1 shows the relationship between reaction times and conversion.

DETAILED DESCRIPTION OF THE INVENTION

The quantity of colloidal sulfur necessary depends on the quantity of residual mercaptans. In general and non-limiting terms, for quantities of mercaptans up to 1,500-2,000 ppm, referring to the rubber, present in a latex containing not more than 25% of solids, it has been found, as described hereunder, that 2,000-4,000 ppm of colloidal sulfur are sufficient. Lower quantities of sulfur correspond to lower quantities of mercaptans, generally with the rule that the weight ratio mercaptan:sulfur (elemental) is within the range of 1:0.5-1:4, preferably within the range 1:0.5-1:2.5.

The treatment can be effected in continuous or batchwise, the two terms referring to two different reactor configurations. In the former case (continuous configuration), the rubber latex is fed continuously to a stirred container maintained at a temperature ranging, for example, from 40 to 80° C. and a colloidal emulsion of sulfur is added continuously, care being taken that the average residence time is not less than 180 minutes. In the second case (batch configuration), the latex and emulsion are fed into a container and reacted until the complete elimination of the mercaptan under the conditions indicated above.

In both cases, the latex is subsequently coagulated, after addition of one or more types of antioxidant, typically a hindered phenol such as, for example, butylhydroxy toluene (BHT), and then dried by means of mechanical extruders.

The colloidal emulsion is obtained by the dispersion of a sulfur powder in water by means of vigorous stirring, for example using a high-speed shear stirrer, in the presence of an emulsifying substance of the anionic or non-ionic type, or a mixture of said substances, so that the quantity of sulfur stably dispersed is not lower than 30% by weight, typically from 40 to 60% by weight. Emulsions containing even lower quantities of sulfur are compatible with the process of the present invention but quite unsuitable for industrial practice due to the greater volumes required.

Some illustrative and non-limiting examples are provided hereunder for a better understanding of the present invention and for its embodiment.

As a non-limiting example, for the experimentation described hereunder, a commercial emulsion known as EURALEX consisting of 50% by weight of sulfur stabilized with an anionic surface-active agent, was used.

EXPERIMENTAL PART

Analytical methods followed for determining the residual mercaptan contained in the nitrile rubber latex.
1. Preparation of the Extract
   2 g of polymer were placed in a 50 ml flask containing 20 ml of chloroform for the dissolution. When the polymer is completely dissolved, coagulation is effected by pouring the solution into a 250 m graded glass containing 150 ml of methanol, under magnetic stirring. The coagulum is eliminated by filtration and is concentrated to a volume of 2 ml.
2. Gaschromatographic Method for Determining the Residual TDM
   The extract prepared as described under point 1 is characterized by means of the gaschromatographic method with a selective detector for sulfurated compounds (GC-FPD). In particular, the following instrumentation is used.
   Analytical Conditions
   GASCHROMATOGRAPH: TRACE 2000;
   COLUMN: HP1 60 mt×0.32 mm×1 µm; 70° C./10 min, 5° C./min,
   200° C./2 min, 20° C./min, 300° C./17 min;
   INJECTOR: 280° C. SPLITLESS METHOD (volume injected 2 µl);
   FPD DETECTOR: 250° C., $H_2$ FLOW, 90 ml/min, AIR FLOW 105 ml/min;
   MAKE-UP: 20 ml/min
   Under the above conditions, with an internal standard (1-octanethiol), the analytical sensitivity limit is <10 ppm.

Example 1

250 ml of latex of a butadiene-acrylonitrile copolymer (33% by weight of ACN) are introduced, after treatment with vapour, into a 500 ml flask, equipped with a reflux cooler and heating jacket. In this way the residual ACN (<10 ppm) is almost completely removed, whereas the residual quantity of mercaptan (TDM) is equal to 140 ppm (corresponding to 704 ppm with respect to the dry product). The latex contains 20% by weight of solid and the surfactant system consists of sodium oleate and stearate.

31 mg of colloidal sulfur (emulsion at 50% of sulfur in water formulated with the same disperser present in the latex) are added to this sample at a temperature of 70° C. and a pH of 9±0.2 for a time of 3 hours.

The latex is coagulated and, after extraction, an analysis of the residual mercaptans is effected (point 1 and 2 of the characterization) and compared with a sample of the same rubber on which no treatment has been effected (blank). These values are indicated in table 1.

Examples 2, 3, 4, 5

Effect of the Sulfur Content

In order to verify the optimum $TDM/S_{elemental}$ weight ratio under the same experimental conditions as Example 1, the latex is treated with increasing quantities of colloidal sulfur and after a reaction time of 180 minutes an analysis of the residual mercaptans is effected. The results are indicated in Table 1.

TABLE 1

| Example | T (° C.) | S (mg) | Reaction time (min) | Residual TDM | S/TDM ratio |
|---|---|---|---|---|---|
| Blank | 70° C. | 0.0 | 180 | 704 | 0.00 |
| 1 | 70° C. | 398.5 | 180 | 255 | 0.57 |
| 2 | 70° C. | 897.1 | 180 | 82 | 1.27 |
| 3 | 70° C. | 1137.7 | 180 | 42 | 1.62 |
| 4 | 70° C. | 1705.1 | 180 | 24 | 2.42 |
| 5 | 70° C. | 3233.7 | 180 | 12 | 4.59 |

Comments on Table 1

From the data of Table 1, it can be noted that the residual TDM eliminated depends on the sulfur content.

From Table 1, it can be observed that the ideal S/TDM ratio (by weight) is centered between 1.5 and 2, and that for a temperature of at least 70° C. for at least 180 minutes these guarantee a reduction of the TDM to below 50 ppm.

Example 5

Temperature Effect

In order to verify the temperature effect, the experiment is carried out at three different temperatures 40, 70, 80° C. and the samples were prepared analogously to Example 1 with the same S/TDM ratio as Example 4 of Table 1. The results are indicated in table 2

TABLE 2

| Example | Temperature (° C.) | Reaction time (hours) | Residual TDM | S/TDM ratio |
|---|---|---|---|---|
| 5 | 80 | Blank | 626 | — |
| 5 | 80 | 1 | 250 | 60.06 |
| 5 | 80 | 2 | 88 | 85.94 |
| 5 | 80 | 3 | 62 | 90.10 |
| 5 | 80 | 4 | 41 | 93.45 |
| 5 | 80 | 5 | 25 | 96.01 |
| 5 | 80 | 6 | 12 | 98.08 |
| 5 | 70 | Blank | 626 | — |
| 5 | 70 | 1 | 120 | 80.83 |
| 5 | 70 | 2 | 36 | 94.25 |
| 5 | 70 | 3 | 27 | 95.69 |
| 5 | 70 | 4 | 22 | 96.49 |
| 5 | 70 | 5 | 11 | 98.24 |
| 5 | 70 | 6 | 10 | 98.40 |
| 5 | 40 | Blank | 626 | — |
| 5 | 40 | 1 | 450 | 28.12 |
| 5 | 40 | 2 | 250 | 60.06 |
| 5 | 40 | 3 | 156 | 75.08 |
| 5 | 40 | 4 | 100 | 84.03 |
| 5 | 40 | 5 | 90 | 85.62 |
| 5 | 40 | 6 | 70 | 88.82 |

Comments on Table 2

It can be noted that the reaction kinetics greatly depends on the temperature. At 80° C., already after 2 hours a reduction in the residual TDM of over 90% can be observed, this time becomes longer when repeating the experiment at 70° C. where 3 hours are necessary for the same conversion value, at 40° C. the time becomes even longer. At temperatures lower than 70° C., as can be seen in the graph of FIG. 1, extremely long reaction times are necessary for reaching a conversion higher than 90%.

Example 6

Effect of the pH on the Elimination Rate of the Residual TDM

In the same experimental configuration and under the best conditions defined under the previous points, S/TDM ratio 2:1, 70° C. for at least 180 minutes, the effect of the environment is evaluated. In this respect, the reaction is carried out at two different pH values. The results are indicated in Table 3.

TABLE 3

| Example | Temperature (° C.) | pH | S/TDM | Time (minutes) | Residual TDM (ppm) |
|---|---|---|---|---|---|
| 6 | 70° C. | 8.7 | 2:1 | 0 | 626 |
|   |        |     |     | 180 | 89 |
|   | 70° C. | 11.5 | 2:1 | 0 | 626 |
|   |        |     |     | 180 | <25 |

Comments on Table 3

From the data of Table 3, it can be observed that a higher pH value causes a higher conversion of the residual TDM with the same temperature (70° C.) and quantity of sulfur added. From the data it can be seen that treatment with an S/TDM ratio centered on a value of 1:2 for a pH of 9±0.3 at temperatures not lower than 70° C. is completely sufficient for guaranteeing the almost total elimination of the residual mercaptan in 180'.

The invention claimed is:

1. A process for the elimination of residual mercaptans from a nitrile rubber comprising one or more butadiene-acrylonitrile copolymers having a content of polymerized nitrile monomer units of from 19 to 45% by weight based on the weight of the butadiene-acrylonitrile copolymers, comprising:
   a. adding a colloidal emulsion of sulfur to a nitrile latex emulsion containing free mercaptan and having a pH of between 7 and 14, at a temperature ranging from 30 to 120° C.;
   b. coagulating the nitrile latex; and
   c. washing with demineralized water and drying the nitrile rubber recovered after coagulation, and
   wherein the butadiene-acrylonitrile copolymers consist of polymerized nitrile monomer units and polymerized butadiene monomer units.

2. The process according to claim 1, wherein the concentration of free mercaptan in the latex ranges from 100 to 3,000 ppm, referring to the rubber.

3. The process according to claim 1 or 2, wherein the nitrile latex emulsion has a solid content ranging from 15 to 40% by weight.

4. The process according to claim 1, wherein the mercaptan:sulfur weight ratio of the sulfur in the free mercaptan is within the range of 1:0.5-1:4 on an elemental basis.

5. The process according to claim 1, wherein the colloidal emulsion has a sulfur concentration ranging from 20 to 60% by weight.

6. A process for eliminating one or more residual mercaptans from a nitrile rubber composition, comprising:
   mixing a colloidal emulsion of sulfur with a nitrile latex emulsion comprising one or more free mercaptans and one or more butadiene-acrylonitrile copolymers, wherein the nitrile latex emulsion has a pH of from 7 to 14 and wherein the mixing is carried out at a temperature of from 30 to 120° C. to form an aqueous suspension comprising the butadiene-acrylonitrile copolymer, sulfur and a reaction product formed by reacting one or more of the mercaptans with the sulfur;
   coagulating the aqueous suspension to form a coagulated mixture comprising the butadiene-acrylonitrile copolymer, the sulfur and the reaction product formed by reacting one or more of the mercaptans with the sulfur;
   recovering the butadiene-acrylonitrile copolymer from the coagulated mixture to obtain a recovered butadiene-acrylonitrile copolymer;
   washing the recovered butadiene-acrylonitrile copolymer with water; and
   drying the washed butadiene-acrylonitrile copolymer, and wherein the nitrile latex emulsion has a solid content of from 15 to 40% by weight.

7. The process according to claim 6, wherein the butadiene-acrylonitrile copolymer comprises from 19 to 45% by weight, based on the weight of the butadiene-acrylonitrile copolymer, of one or more co-polymerized nitrile monomer units.

8. The process according to claim 6, wherein the concentration of the one or more mercaptans and the nitrile latex emulsion is from 100 to 3,000 ppm based on the total weight of the butadiene-acrylonitrile copolymer present in the nitrile latex emulsion.

9. The process according to claim 6, wherein the mercaptan:sulfur weight ratio of the sulfur in the free mercaptan is within the range of from 1:0.5 to 1:4 on an elemental basis.

10. The process according to claim 6, wherein the colloidal emulsion of sulfur has a sulfur content of from 20 to 60% by weight.

11. A process for eliminating one or more residual mercaptans from a nitrile rubber composition, comprising:
   mixing a colloidal emulsion of sulfur with a nitrile latex emulsion comprising one or more butadiene-acrylonitrile copolymers and one or more mercaptans, and having a pH of from 7 to 14, wherein the mixing is carried out at a temperature of from 30 to 120° C. to form an aqueous suspension comprising the butadiene-acrylonitrile copolymer, the sulfur and a reaction product formed by reacting the sulfur with the mercaptan;

coagulating the aqueous suspension with an antioxidant to form a coagulated mixture;

recovering a nitrile rubber composition having a reduced content of the mercaptans;

washing with water; and drying the nitrile rubber composition, and wherein the colloidal emulsion of sulfur has a sulfur content of from 20 to 60% by weight.

12. The process according to claim 11, wherein the antioxidant is a butylhydroxy toluene.

13. The process according to claim 11, wherein the butadiene-acrylonitrile copolymer comprises from 19 to 45% by weight, based on the weight of the butadiene-acrylonitrile copolymer, of one or more co-polymerized nitrile monomer units.

14. The process according to claim 11, wherein the concentration of the one or more mercaptans and the nitrile latex emulsion is from 100 to 3,000 ppm based on the total weight of the butadiene-acrylonitrile copolymer present in the nitrile latex emulsion.

15. The process according to claim 11, wherein the nitrile latex emulsion has a solid content of from 15 to 40% by weight.

16. The process according to claim 11, wherein the mercaptan:sulfur weight ratio of the sulfur in the free mercaptan is within the range of 1:0.5-1:4 on an elemental basis.

* * * * *